Dec. 28, 1954 K. W. ELMINGER 2,697,899
CLAMPING BAR
Filed March 5, 1951 3 Sheets-Sheet 3
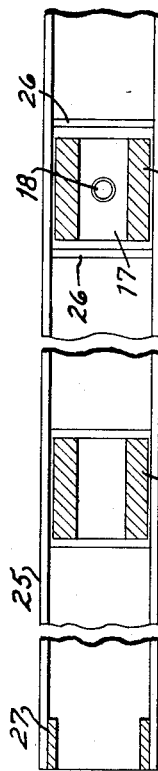
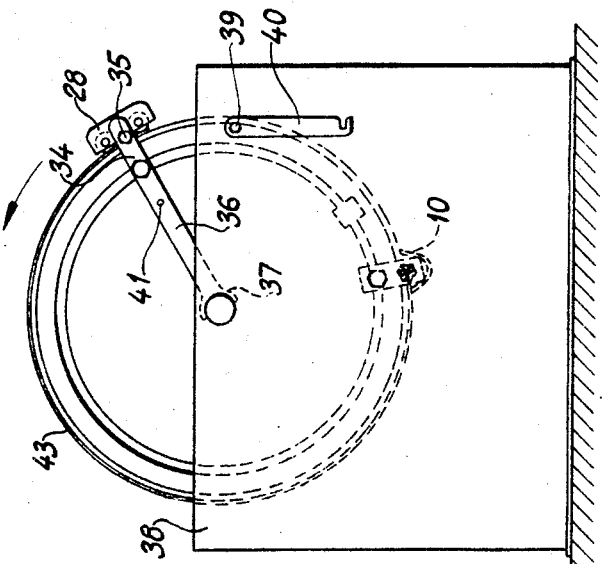
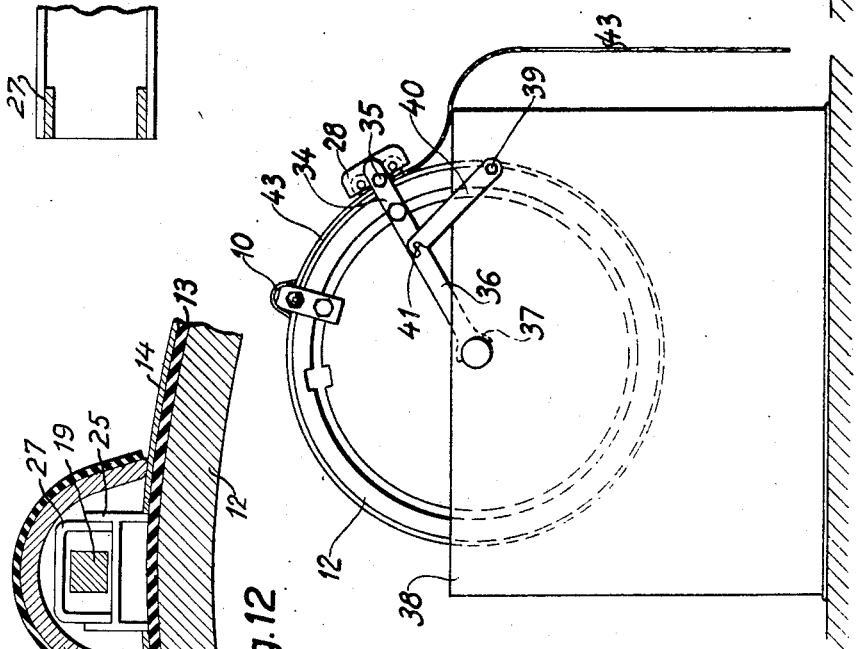
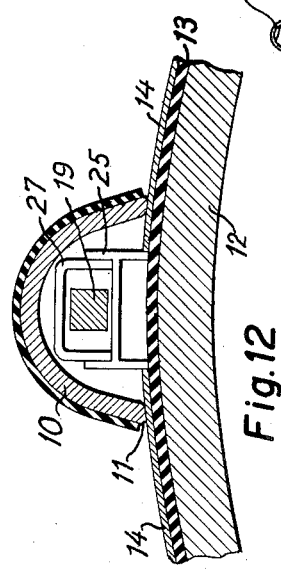
INVENTOR.
K. W. Elminger
BY Henry C. Parker
Atty.

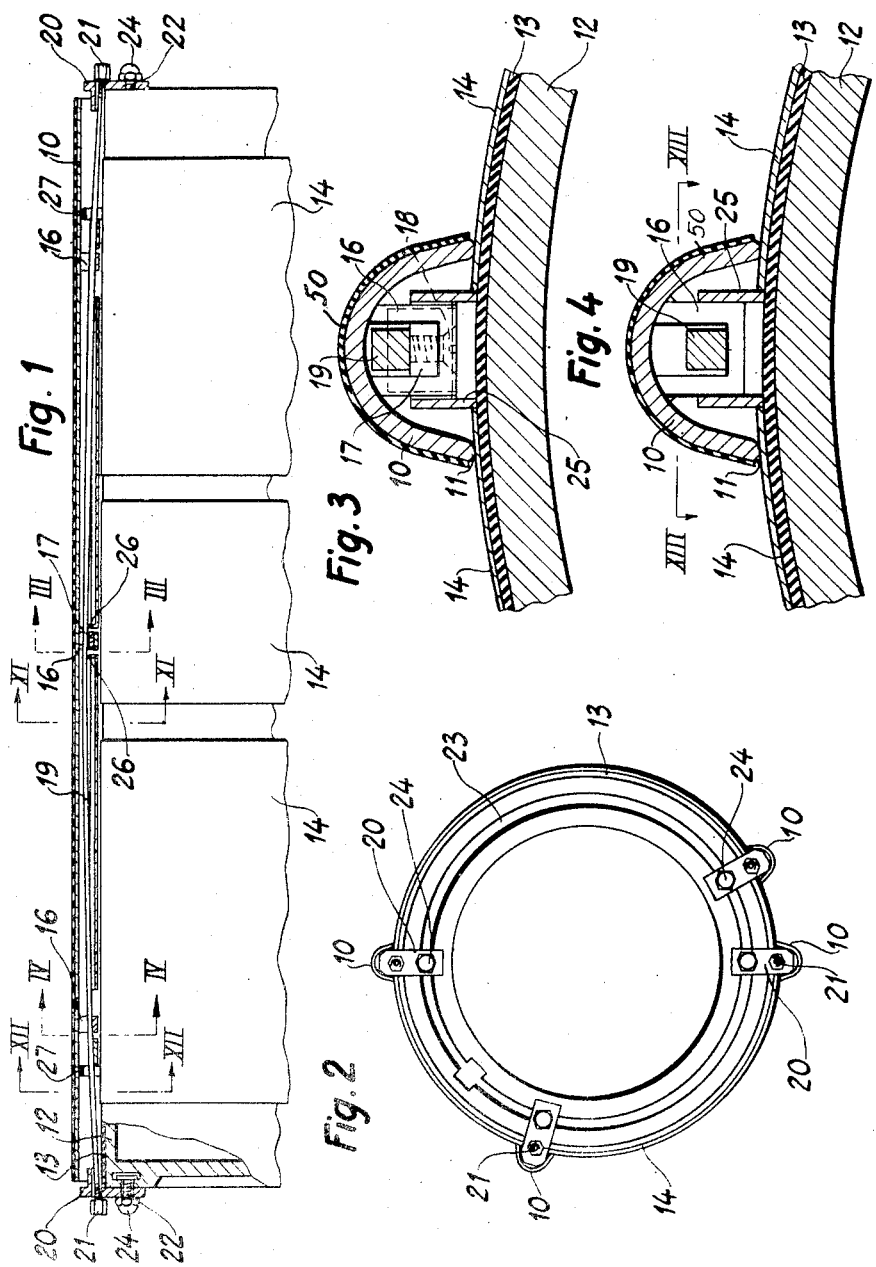

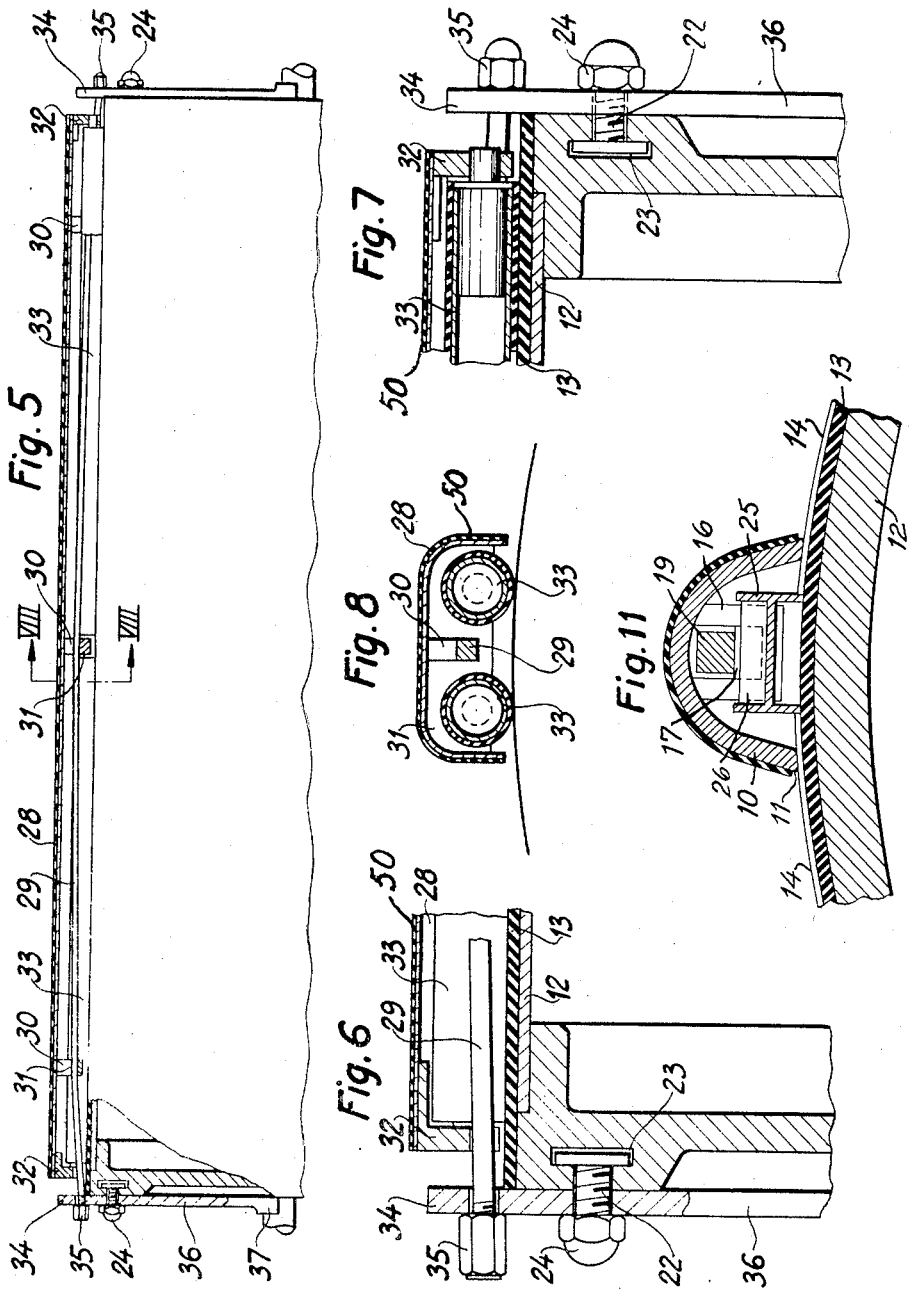

United States Patent Office 2,697,899
Patented Dec. 28, 1954

2,697,899

CLAMPING BAR

Karl Wilhelm Elminger, Duvbo, Sundbyberg, Sweden, assignor to Aktiebolaget Johnson & Borsell, Stockholm, Sweden, a corporation of Sweden Application March 5, 1951, Serial No. 213,892

Claims priority, application Sweden March 21, 1950

12 Claims. (Cl. 51—217)

In the engineering practice it is often desired to be able temporarily to clamp plates or other objects in the form of sheets onto the curved surface of a rotatable cylindrical drum or onto some other base surface without having to make interruptions in the base surface in the form of fixing holes. In many cases it is suitable to use for said purpose clamping bars which at their ends only are provided with means for pressing the bar onto the base, the plates or the like being inserted at opposite edges in under the corresponding bars and being then clamped in position by means of the bars. The known clamping bars of the said kind have the inconvenience, however, that on account of the flexibility of the bar the pressure from the bar against the base is less at the middle of the bar than at the ends thereof. Said inconvenience makes itself particularly apparent if the bar has a considerable length and is to be used for clamping a plurality of plates or the like in position side by side. Said difficulties could be eliminated to a certain extent by making the bar somewhat convexly curved or by making the same with a very high bending strength, but said solutions are not under all conditions satisfactory.

The present invention has for its object to provide a clamping bar by means of which, independently of the length of the bar and in the main independently of its stiffness, substantially the same pressure can be exerted on a base having a ruled surface at all points along the bar. For said purpose the bar is combined with a flexible tension member in the form of a rod, a steel band, a wire or the like which extends along an arc in a plane transverse to the base and over a number of supports which are spaced along the bar and are united therewith, said tension member being adapted to be secured at its ends directly or indirectly to the base by means of members which permit of stretching the flexible tension member, in order that said member shall press the bar in a direction towards the base at its points of support.

The invention is applicable to clamping bars in the restricted meaning of said term, which bars are adapted to bear directly against the object to be clamped in position, and also to such clamping bars which are adapted to bear on the base through the intermediary of separate pressing members, consisting by way of example of rollers which are rotatably journaled in the bar.

The invention will be described more in detail in the following having reference to the appended drawings which show two different embodiments of clamping bars adapted to be attached to a base in the form of a rotatable cylindrical drum.

On the drawings:

Figure 1 is a longitudinal section through a clamping bar adapted to bear directly on the object to be clamped in position, the clamping bar being shown in position on the drum, Figure 2 is an end view of the drum with four clamping bars attached thereto, Figures 3 and 4 show on a larger scale cross sections on the lines III—III and IV—IV in Figure 1, Figure 5 is a longitudinal section through a clamping bar provided with pressing rollers, the clamping bar being shown in position on the drum, Figures 6 and 7 show partial sections on a larger scale in the tension rod plane and through one of the pressing rolls respectively, Figure 8 shows on the same scale a cross section on the line VIII—VIII in Figure 5, Figures 9 and 10 illustrate a manner of using a clamping bar provided with rollers, Fig. 11 is a vertical cross section on a larger scale taken along the line XI—XI of Fig. 1, Fig. 12 is a similar cross sectional view taken along the line XII—XII of Fig. 1, while Fig. 13 is a plan view of the stop or H-bar on the same scale taken along the line XIII—XIII of Fig. 4 with the clamping bar removed.

In the embodiment shown in Figures 1 to 4, the clamping bar 10 has a channel-shaped or U-shaped cross section with the free edges 11 of the side portions which are to bear directly on the object to be clamped somewhat rounded. In the example shown the base consists of a rotatable cylindrical drum 12 the curved surface of which is provided with a covering 13 of rubber, whereas the objects to be clamped onto the drum between the drum and the contacting edges 11 of the clamping bar consist of a number of lithographic printing plates 14 which are to be grained by sand-blasting.

At the middle and near each end of the clamping bar there are welded to the inside of the bar three yokes 16. Inserted in the intermediate yoke is a spacer 17 which is held in position by a screw 18. Passing through the three yokes 16 is a tension member in the form of a steel rod 19 of square cross section, said rod being cylindrically rounded and screw-threaded at its ends. The tension rod 19 projects with its threaded ends through holes in coupling pieces 20, and screwed onto said projecting ends of the rod are tightening nuts 21. The coupling pieces 20 are adapted to be clamped to the end walls of the drum 12 in arbitrary angular positions, each piece with the aid of a bolt 22 which enters with a T-shaped head into a circular groove 23 of corresponding cross section provided in the end wall of the drum, a clamping nut 24 being screwed onto the threaded end of the bolt projecting out through a hole in the coupling piece.

When the tension nuts 21 are tightened after the lithographic plates 14 have been inserted in position under the clamping bar, the comparatively flexible tension rod 19 will be subjected to a powerful drawing so that the rod endeavours to straighten itself. The rod thus strives to move the yokes 16 in a direction towards the drum 12, resulting in that the bar 10 is pressed onto the drum at the points of the yokes. The ratio between the forces with which the tension rod presses the bar against the base at the different points of support 16 depends on the relative distances of the supports from the drum. A change of said ratio may readily be obtained by substituting for the spacer 17 a thinner or thicker spacer, the inwardly directed pressure force from the tension rod at the middle of the bar increasing with an increase in the thickness of the spacer and diminishing when a thinner spacer is chosen.

To prevent the plates 14, which are to be clamped to the drum 12 by means of the clamping bar 10, from being inserted too far in under the contacting edges 11 of the clamping bar in connection with the fastening of the plate onto the drum, each clamping bar 10 is provided with a stop bar 25. The said stop bar 25, which in cross section has the shape of an H, is guided in a plane extending perpendicularly to the base by the fact that the parallel flanges of the stop bar embrace the yokes 16 with a certain play. At the yokes the horizontal web plate of the stop bar is cut away, and at the middle yoke the web is bent upwardly at opposite sides of the yoke, so that guides 26 are formed which prevent the stop bar 25 from becoming displaced in the longitudinal direction of the clamping bar. At the ends of the bar there are secured between the flanges of the stop bar two upwardly directed U-shaped straps 27 which limit the movement of the stop bar in a direction away from the base. When the plates 14 are inserted under the clamping bar 10 while said bar occupies its uppermost position, the stop bar 25 will bear on the drum 12 with the lowermost edges of its flanges under the action of gravity, as shown in Figures 3 and 4, forming a stop which limits the insertion of the printing plates 14 under the edges 11 of the clamping bar 10.

In the embodiment according to Figures 5 to 8 the clamping bar 28 proper has, similarly to the clamping bar 10 according to the embodiment described above, a channel-shaped cross-section but has a larger width as compared with its height. The flexible tension member consists of a square steel rod 29 which is passed along an arc in the central plane of the bar through openings 30 provided at suitable elevations in three fixed cross walls 31. Provided at the ends of the bar are fixed cross walls 32 which are provided with spacious passage recesses for the tension rod 29. In the middle cross wall 31 and in the respective end walls 32 there are rotatably journaled in pairs at opposite sides of the tension rod 29 four rubber-covered rollers 33, which are intended to bear against the object to be fastened onto the curved surface of the rotatable drum. For the purpose of clamping the coupling pieces 34 of the clamping bar in position on the drum there are provided clamping bolts 22 which enter with a T-shaped head into a circular groove 23 provided in the end wall of the drum, the said clamping bolts co-operating each with a clamping nut 24. The tension rod 29 projects with threaded ends out through holes provided in the coupling pieces 34. On tightening of the clamping nuts 35 screwed onto the threaded ends of the tension rod 29, the bar 28 will evidently be pressed by the rod in a direction toward the drum 12, the rollers 33 then pressing against the printing plate with an increasing force.

The above described roller type clamping bar is intended to be used particularly in connection with the securing to the drum of very broad and unhandy lithographic printing plates. For said purpose the coupling pieces 34 are formed each with a radially extending inwardly directed extension 36 which engages the shaft of the drum 12 with a semi-circular guide shoe 37. The coupling pieces 34 are adapted to be temporarily locked in position with respect to the machine frame 38 with the aid of arms 40 which are turnable with respect to the frame about pins 39 and are adapted to be swung up from their inoperative position shown in Figure 10 to their supporting position shown in Figure 9, in which latter position a slot or indentation provided in the arm 40 near the free end of the arm engages a pin 41 on the extension 36 of the coupling piece 34.

When a printing plate 43 which is particularly broad and difficult of handling is to be secured on the drum 12, the roller bar 28 is locked in the position shown in Figure 9 with respect to the machine frame by means of the arm 40. Hereafter the drum 12 is turned until a clamping bar 10 of the type shown in Figures 1 to 4 becomes positioned immediately adjacent to the roller bar 28 and above the latter. After the clamping nuts 21 and 35 on the ordinary clamping bar 10 and on the roller bar 28 respectively have been loosened, the plate 43 is inserted by hand under the roller bar 28 onto and in under the ordinary clamping bar 10, the clamping nuts 21 of the latter being thereafter tightened to cause the leading edge of the plate 43 to be securely clamped below the clamping bar 10. Thereafter the clamping nuts 35 of the roller bar 28 are tightened somewhat, so that the pressing rollers 33 will press against the plate 43 with a moderate pressure. By means of the driving motor the drum 12 is then rotated slowly in the direction of the arrow, so that the plate 43 is pulled further in under the roller bar 28, the plate being simultaneously stretched and mangled to smooth engagement with the drum 12. After the drum has been rotated to the position shown in Figure 10, in which the lagging edge of the plate 43 is positioned just below the roller bar 28, the clamping nuts 35 of said bar are tightened further, so that the plate 43 becomes securely clamped to the drum also at said edge. The supporting arms 40 are then swung down to their inoperative position shown in Figure 10. The plate 43 is now securely clamped to the drum 12, so that the drum can be freely rotated at the desired speed and in the desired direction together with the clamping bars and the printing plate. In both embodiments of my clamping bar the outside of the bar can be provided with a rubber layer 50, if desired, to protect it from the sand blast.

The invention is, of course, not limited to the embodiments shown on the drawings, but modifications of various kind are conceivable without receding from the inventive idea.

I claim:

1. A device for clamping sheeted material against bases having flat and cylindrical surfaces, which comprises an elongated flexible tensioning member, clamping means at opposite ends of said flexible tensioning member for detachably anchoring said tensioning member to said base, a unitary clamping bar mounted to extend along said flexible tensioning member above the surface of the base, rigid means connecting said clamping bar and said tensioning member at spaced points for holding said tensioning member in the form of an arc lying in a plane perpendicular to the surface of the base with the apex of the arc substantially in the center of the clamping bar, pressing means mounted longitudinally on said clamping bar on both sides of said tensioning member adapted to press sheeted material against the base upon the application of pressure to said clamping bar, and means mounted at the ends of said tensioning member for increasing the longitudinal tension on said member thus tending to straighten said arc and to force said clamping bar towards the base, thereby applying adjustable pressure through said pressing means to the edges of the sheeted material along the length of the clamping bar and on both sides of the tensioning member.

2. The device of claim 1 wherein said pressing means are depending flanges mounted along the edges of said clamping bar.

3. The device of claim 1 wherein said pressing means are longitudinal rolls mounted for rotation on either side of said tensioning member in bearings which are supported by said clamping bar.

4. The device of claim 3 wherein said rolls extend from the ends of the clamping bar substantially to its center at which point bearings are provided.

5. The device of claim 1 wherein said base is the surface of a rotatable drum, said pressing means are longitudinal rolls mounted for rotation on either side of said tensioning means and said clamping means are provided with radial extensions pivoting on the axis of said drum whereby the clamping bar can be rolled around the surface of the drum.

6. The device of claim 1 wherein said base is a rotary drum and said clamping means are adjustably secured to the drum ends so the clamping bar can be clamped in any desired radial position.

7. The device of claim 1 wherein the clamping bar has a cross section in the form of an inverted U and the tensioning member is supported inside said U by yoke members attached at a plurality of spaced points to the clamping bar, the side arms of the U forming said pressing means.

8. The device of claim 1 wherein longitudinal stop members are provided which bear against the surface of the base mounted on either side of said tensioning member inside said pressing means to act as stops for the sheets of material as they are inserted beneath said pressing means.

9. The device of claim 8 wherein said stop members have a cross section in the form of an H the upper branches of which embrace guide members mounted on said clamping bar.

10. The device of claim 1 wherein the device is an apparatus for holding plates during sand blasting and wherein the outer surface of said clamping bar is protected with a layer of rubber.

11. The device of claim 1 wherein said clamping bar is channel-shaped and in the form of a hood protecting the tensioning and pressing members and a rubber protective coating is supplied on the outside surface of the clamping bar.

12. A device for holding lithographic plates and the like during graining which comprises a rotatable drum, an elongated flexible tensioning member extending axially above the surface of the drum with its ends detachably anchored in the drum, means for imposing longitudinal tension on said tensioning member, a unitary clamping bar mounted to extend along said flexible tensioning member above the surface of the base, rigid means connecting said clamping bar and said tensioning member for holding said tensioning member in the form of an arc lying in a plane perpendicular to the drum surface the apex of which arc is substantially in the center of the drum in such manner that when tension is applied to the tensioning member pressure is applied to the clamping bar tending to force it against the surface of the drum, and pressing means mounted longitudinally on said clamping bar on both sides of said tensioning member in such manner that when pressure is applied to the bar the pressing means are pressed against the drum surface along the length of the clamping bar, thereby to hold sheet material on the drum surface.

References Cited in the file of this patent

UNITED STATES PATENTS

| Number | Name | Date |
|---|---|---|
| 2,005,654 | Fritsche | June 18, 1935 |
| 2,155,121 | Finsterwalder | Apr. 18, 1939 |
| 2,330,471 | Clark | Sept. 28, 1943 |
| 2,495,269 | Lindmark | Jan. 24, 1950 |
| 2,541,254 | Huck et al. | Feb. 14, 1951 |
| 2,600,127 | Reaser et al. | June 10, 1952 |